United States Patent [19]
Ortoli

[11] Patent Number: 5,827,983
[45] Date of Patent: Oct. 27, 1998

[54] LAPTOP KEYBOARD TESTING DEVICE

[75] Inventor: Gerald L. Ortoli, Cary, N.C.

[73] Assignee: Ziff-Davis Publishing Company, New York, N.Y.

[21] Appl. No.: 738,888

[22] Filed: Oct. 28, 1996

[51] Int. Cl.⁶ .................................................. G01M 19/00
[52] U.S. Cl. ........................................................ 73/865.3
[58] Field of Search .............................. 73/808, 813, 811, 73/865.3, 865.9, 12.9, 12.03, 865.6; 324/426, 427, 428

[56] References Cited

U.S. PATENT DOCUMENTS

| | | |
|---|---|---|
| 2,311,752 | 2/1943 | Hofmann ................................ 73/865.9 |
| 3,183,599 | 5/1965 | Byrd et al. . | 
| 3,597,981 | 8/1971 | Wakabayashi et al. . |
| 3,768,622 | 10/1973 | Wood . |
| 4,441,833 | 4/1984 | Hasenbalg . |
| 5,192,152 | 3/1993 | Silvestri et al. . |

FOREIGN PATENT DOCUMENTS

| | | |
|---|---|---|
| 2144452 | 3/1973 | Germany . |
| 821218 | 4/1979 | Russian Federation . |
| 1158-381 | 8/1983 | Russian Federation . |

*Primary Examiner*—Robert Raevis
*Attorney, Agent, or Firm*—Seth H. Ostrow, Esq.

[57] ABSTRACT

A keyboard testing device for actuating at least one key on a keyboard. The testing device includes a frame having a first portion for supporting a keyboard, and a second portion. A rotatable key actuator is supported by the second portion of the frame. An adjustment mechanism couples the rotatable key actuator to the second portion of the frame which allows adjustment of the actuator with respect to a computer keyboard supported on the first portion of the frame. A motor support on the second portion supports a motor which rotates the key actuator to regularly activate one of the keys on the keyboard.

21 Claims, 2 Drawing Sheets

LAPTOP KEYBOARD TESTING DEVICE

BACKGROUND OF THE INVENTION

The present invention is directed generally to a laptop keyboard testing device, and, in particular, to a computer keyboard testing device designed to selectively depress one or more keys on the computer keyboard on a regular repeatable interval for the purpose of testing the performance of the battery which powers the laptop.

There are many different types and brands of portable laptop computers with various features and attributes. Such laptop computers are generally powered by a rechargeable, replaceable battery. The characteristics of the particular battery used in a laptop computer as well as the power management features of the laptop computer determine in part the length of time that the laptop computer will run on the battery before recharging of the battery is necessary.

Purchasers of electronic equipment, including in particular, laptop computers, are interested in comparing the various features of different devices so that they may make a reasoned decision on purchasing a desired unit. Additionally, purchasers are interested in optimizing the operation of various features of specific devices, particularly those related to power management. Various tests have been developed by different organizations to test various aspects and features of such electronic equipment.

One desirable test is to determine the output power characteristics and charge maintaining longevity of the battery in a laptop computer. In addition to computer software that is used to track and measure battery performance, it is necessary to provide an appropriate and reliable testing device which can regularly, reliably and repeatedly depress one or more keys on the keyboard of the laptop computer to simulate use thereof so that battery performance can be measured. In such testing devices, it is important that the device be easy to use while not damaging the keys or other components of the laptop computer. In order to provide reliable testing results, it is also important that the test parameters be the same for each keyboard tested.

Accordingly, it is desired to provide a laptop keyboard testing device having the features, attributes and benefits noted herein.

SUMMARY OF THE INVENTION

Generally speaking, in accordance with the present invention, a keyboard testing device for actuating at least one key on a keyboard is provided. The keyboard testing device includes a frame having a first portion for supporting a keyboard and a second portion. A rotatable key actuator is supported on the second portion of the frame and is adjustable thereon with respect to the first portion to allow adjustment of the position of the rotatable key actuator with respect to a keyboard placed on the first portion of the frame. A motor or other rotating device is provided for rotating the rotatable key actuator to periodically actuate one of the keys on the keyboard.

In a preferred embodiment, the rotatable key actuator includes a rotatable wheel having several fingers extending outwardly therefrom. The fingers sequentially depress and release a key on the keyboard as the wheel is rotated. During operation, the wheel rotates at a predetermined speed to ensure the same period of actuation as each finger contacts the key.

Longitudinal adjustment of the actuator allows the actuator to be properly positioned with respect to the keyboard so that the fingers on the wheel can depress and release a key on the keyboard without applying too much pressure which could lead to potential damage to the keyboard or laptop computer.

Accordingly, it is an object of the present invention to provide a laptop keyboard testing device.

Another object of the present invention is to provide a laptop keyboard testing device having a rotatable actuator with at least one finger for depressing a key on a laptop computer.

A further object of the present invention is to provide a keyboard testing device for regularly depressing a key on a laptop computer for testing the battery performance of the battery which powers the laptop computer.

A still further object of the present invention is to provide a laptop keyboard testing device which is self-contained on a frame on which the key actuator is supported and which can support the laptop computer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicted in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
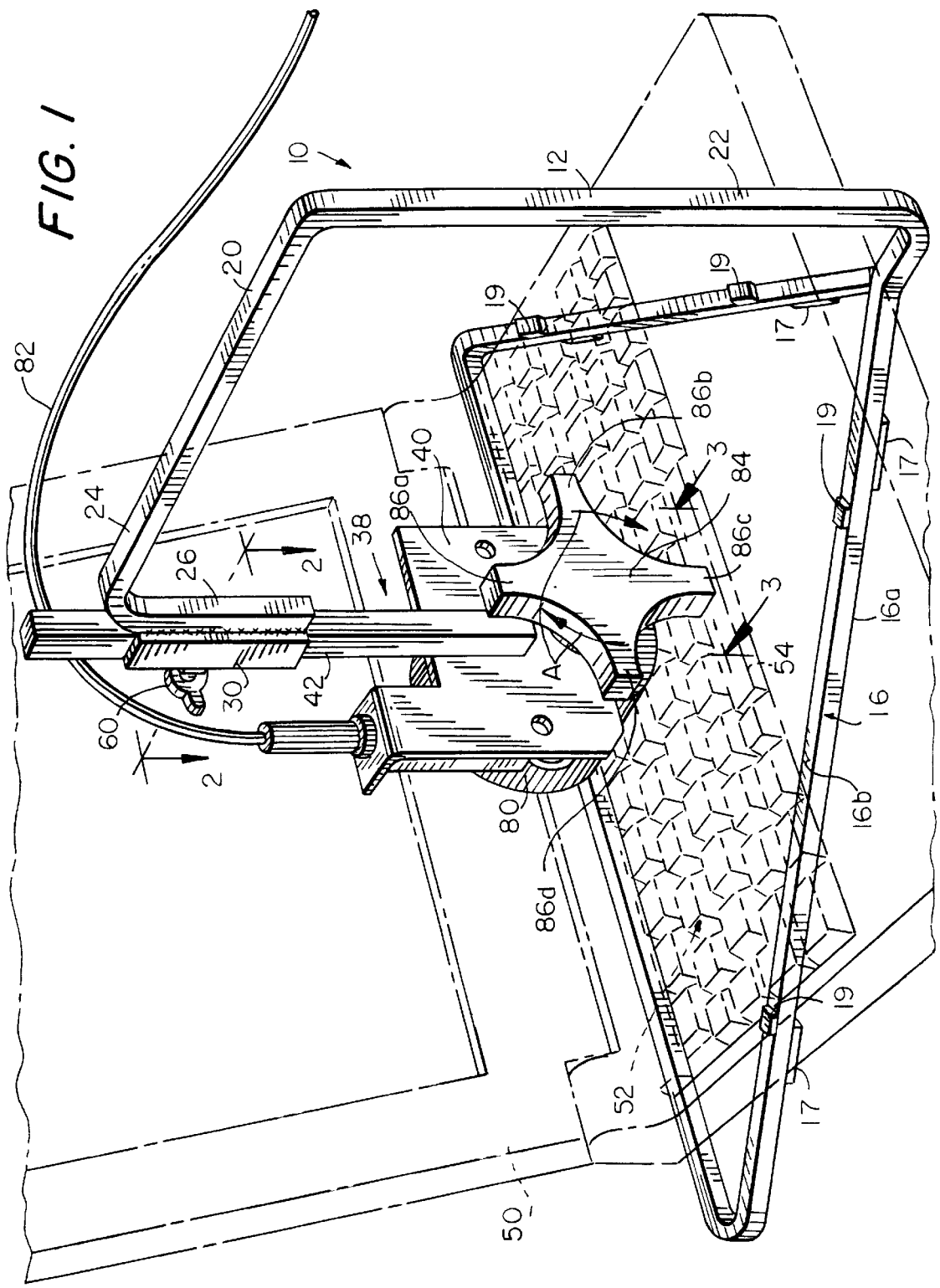
FIG. 1 is a perspective view of a laptop keyboard testing device constructed in accordance with a preferred embodiment of the present invention, with a laptop keyboard depicted in phantom and shown positioned on the frame of the device.

Reference is first made to FIG. 1 of the drawings which depicts a laptop keyboard testing device, generally indicated at 10, constructed in accordance with a preferred embodiment of the present invention. Laptop keyboard testing device 10 includes a frame 12 having a first base portion 16 and a generally C-shaped arm 20 forming a second portion extending upwardly from and back over first base portion 16.

First base portion 16 is triangular shaped as depicted to provide a stable support on a flat surface such as a tabletop or the like. It is recognized that other shapes may be utilized such as square, rectangular, circular or the like so long as a stable base is provided to rest on a flat surface while allowing support for a laptop computer such as laptop computer 50 depicted in phantom in FIG. 1, or other such devices. Base portion 16 may also include several feet 17 on the bottom 16a thereof to prevent scratching of the surface on which the device rests and also to prevent the device from sliding on that surface. Also, pads 19 may be provided on the top 16b of base portion 16 to prevent scratching or other damage to the laptop computer while it is resting thereon.

C-shaped arm 20 includes a vertical portion 22 which is attached to and extends upwardly from base portion 16, a horizontal portion 24 which extends back over base portion 16, and a downwardly extending portion 26 which acts as a mounting support for a rectangular shaped vertically extending collar or sleeve 30. It must be appreciated that arm 20 and collar 30 may take many forms and shapes so long as arm 20 extends above base 16.

Frame 12 is preferably formed from a metal material but it is recognized that many different materials may be used such as plastic, synthetic materials or other materials which can provide a rigid frame.

Figure 2:
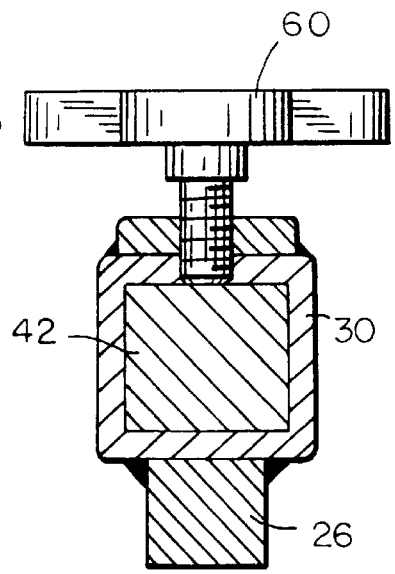
FIG. 2 is an enlarged sectional view taken along line 2—2 of FIG. 1.

Referring now additionally to FIG. 2, it is seen that collar 30 acts as a motor mount support bracket as will now be described. A motor support assembly, shown generally as 38, includes a panel 40 supported on a motor mount support rod 42 which is depicted to be in rectangular shape so as to fit within collar 30 and slide therealong. A thumbscrew 60 or other such locking device is provided to position and releasably lock motor support assembly 38 at a desired height in the longitudinal direction for purposes which will be explained hereinafter.

The rectangular configuration of collar 30 and rod 42 allows motor support assembly 38 to be oriented in any of the four positions that the assembly can be positioned. It is noted that this configuration offers an appropriate range of adjustment with excellent setup repeatability.

A motor 80 is supported by panel 40 and is coupled to an actuator 84 which is rotated by motor 80. A power cord 82 is coupled to motor 80 to supply the power for running the motor. When powered, motor 80 will rotate actuator 84 at a predetermined desired speed in the direction of arrows A. Motor 80 can be a fixed speed motor if simplicity of design is desired or a controllable speed motor if flexibility in operation is desired. Actuator 84 includes four equally spaced, radially extending, fingers 86a, 86b, 86c and 86d. It is noted that the object of the invention can be accomplished using one or more fingers. Actuator 84 is preferably formed of a plastic material, but other materials may be used.

The laptop keyboard testing device as described and depicted herein is preferably used to test the battery performance on laptop computers. To do this, the device is used to regularly and repeatedly depress a key on the keyboard while a software program and other testing equipment are used in conjunction therewith to measure the performance of the battery in the laptop computer. In order to perform testing and accurate results, it is crucial that the same test conditions be used for the different laptop computers. The present invention provides such a device.

In use, the keyboard of a laptop computer, such as keyboard 52 of laptop computer 50 is positioned on base 16 under actuator 84. It is preferred that spacebar 54 be positioned under actuator 84 to provide the most appropriate and largest key for actuation. It is recognized that other keys may be used, however. Thumbscrew 60 is loosened to allow vertical adjustment of motor support assembly 38 so that fingers 86a through 86d will depress and release key 54 as the actuator is rotated. The appropriate height can be selected to prevent damage to the keyboard. The slight flexure provided by C-shaped arm 20 nonetheless operates as an added safety precaution by accommodating actuator height misadjustments and thereby preventing damage to the keyboard.

Figure 3:
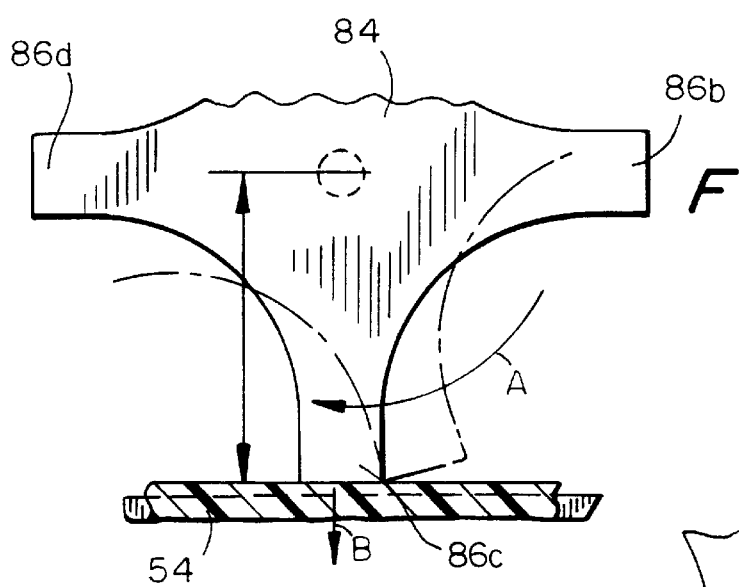
FIG. 3 is an enlarged sectional view taken along line 3—3 of FIG. 1.
Figure 4:
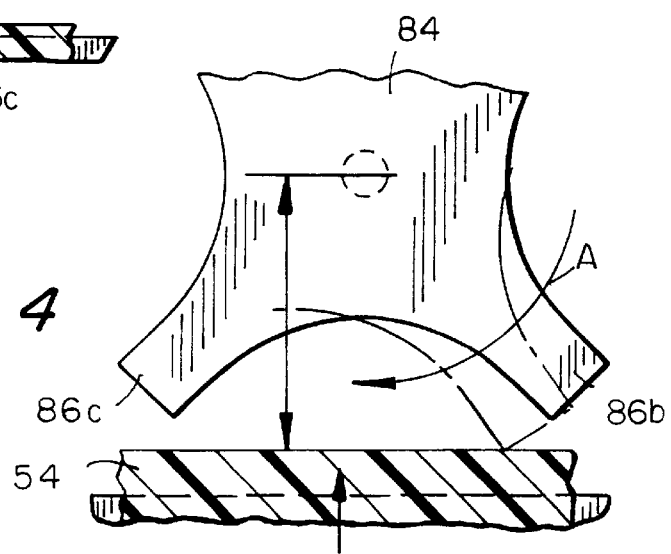
FIG. 4 is a sectional view similar to FIG. 3 but showing the actuator wheel after a finger has been rotated away from a key on the keyboard.

Referring now additionally to FIGS. 3 and 4, it is seen that as actuator 84 is rotated in the direction of arrow A, finger 86c will depress key 54 in the direction of arrow B. As rotation continues in the direction of arrow A, key 54 will be released as finger 86c is rotated away and finger 86b is then next to depress and release key 54. The process is repeated during the testing process and the battery performance of the laptop computer can be measured. Alternatively, actuator 84 could rotate in a counter-clockwise direction to accomplish the same result.

The height and orientation adjustments which are allowed with the present device make it suitable for use with all types, shapes and sizes of laptop computer or other similar keyboards. While a four lobe or finger actuator is depicted, other configurations such as a two lobe actuator may be used. The motor is preferably powered by a low voltage AC such as 24 VAC supplied from a wall outlet through an intermediate transformer.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A keyboard testing device for actuating at least one key on a keyboard, comprising a frame having a first portion for supporting a keyboard and a second portion, a rotatable key actuator supported by said second portion of said frame, an adjustment mechanism coupling said rotatable key actuator to said second portion of said frame which allows adjustment of said rotatable key actuator with respect to a keyboard supported on said first portion of said frame, and a motor support on said second portion for supporting a motor to rotate said rotatable key actuator to regularly actuate one of the keys on said keyboard.

2. The keyboard testing device as claimed in claim 1, wherein said second portion of said frame extends upwardly from said first portion and over said first portion.

3. The keyboard testing device as claimed in claim 2, wherein said second portion includes a collar, said adjustment mechanism including a rod slidably receivable in said collar, and a locking mechanism which selectively, releasably locks said rod in a desired position with respect to said collar.

4. The keyboard testing device as claimed in claim 3, wherein said collar includes a rectangular opening, said rod being rectangular and being receivable in said rectangular opening of said collar in various orientations.

5. The keyboard testing device as claimed in claim 4, wherein said locking mechanism is a thumbscrew on said collar.

6. The keyboard testing device as claimed in claim 1, wherein said actuator includes at least two fingers which will regularly depress and release a key on a keyboard positioned below said actuator on said frame.

7. The keyboard testing device as claimed in claim 6, wherein said actuator includes four regularly spaced fingers extending radially therefrom.

8. The keyboard testing device as claimed in claim 1, wherein a plurality of feet are supported at suitable intervals on a bottom surface of the first portion of said frame.

9. The keyboard testing device as claimed in claim 1, wherein a plurality of pads are supported at suitable intervals on a top surface of the first portion of said frame.

10. The keyboard testing device as claimed in claim 1, wherein said frame is formed of a material permitting slight flexure of said frame to accommodate slight misadjustments of said keyboard testing device.

11. The keyboard testing device as claimed in claim 10, wherein said frame is formed from metal.

12. The keyboard testing device as claimed in claim 11, wherein said actuator is formed from plastic.

13. The keyboard testing device as claimed in claim 1, wherein said second portion is generally C-shaped and has a first end coupled to said first portion, and a second free end, said adjustment mechanism and actuator being supported on the free end of said second portion.

14. The keyboard testing device as claimed in claim 1, wherein said motor is a fixed speed motor.

15. The keyboard testing device as claimed in claim 1, wherein said motor is a controllable speed motor.

16. A keyboard testing device for actuating at least one key on a keyboard, comprising a frame having a base for supporting a keyboard and an arm, a key actuator supported by said arm to extend over said base, an adjustment mechanism coupling said key actuator to said arm of said frame which allows adjustment of said key actuator with respect to a keyboard supported on said base of said frame, and a motor support on said arm for supporting a motor to drive said key actuator to regularly actuate said at least one key on said keyboard, said base presenting a generally flat surface to support a laptop keyboard thereon, said adjustment mechanism allowing vertical height adjustment of said key actuator with respect to said base, said adjustment mechanism allowing said key actuator to be reoriented with respect to said base, said key actuator including a plurality of fingers for consecutively depressing and releasing said at least one key on said keyboard.

17. The keyboard testing device as claimed in claim 16, wherein said frame allows said keyboard to be positioned intermediate said base and said key actuator.

18. The keyboard testing device as claimed in claim 16, wherein a plurality of feet are mounted at suitable intervals on a bottom surface of the base of said frame.

19. The keyboard testing device as claimed in claim 16, wherein said frame is formed of a material permitting slight flexure of said frame to accommodate slight misadjustments of said keyboard testing device.

20. The keyboard testing device as claimed in claim 16, wherein said motor is a fixed speed motor.

21. The keyboard testing device as claimed in claim 16, wherein said motor is a controllable speed motor.

\* \* \* \* \*